Patented May 1, 1928.

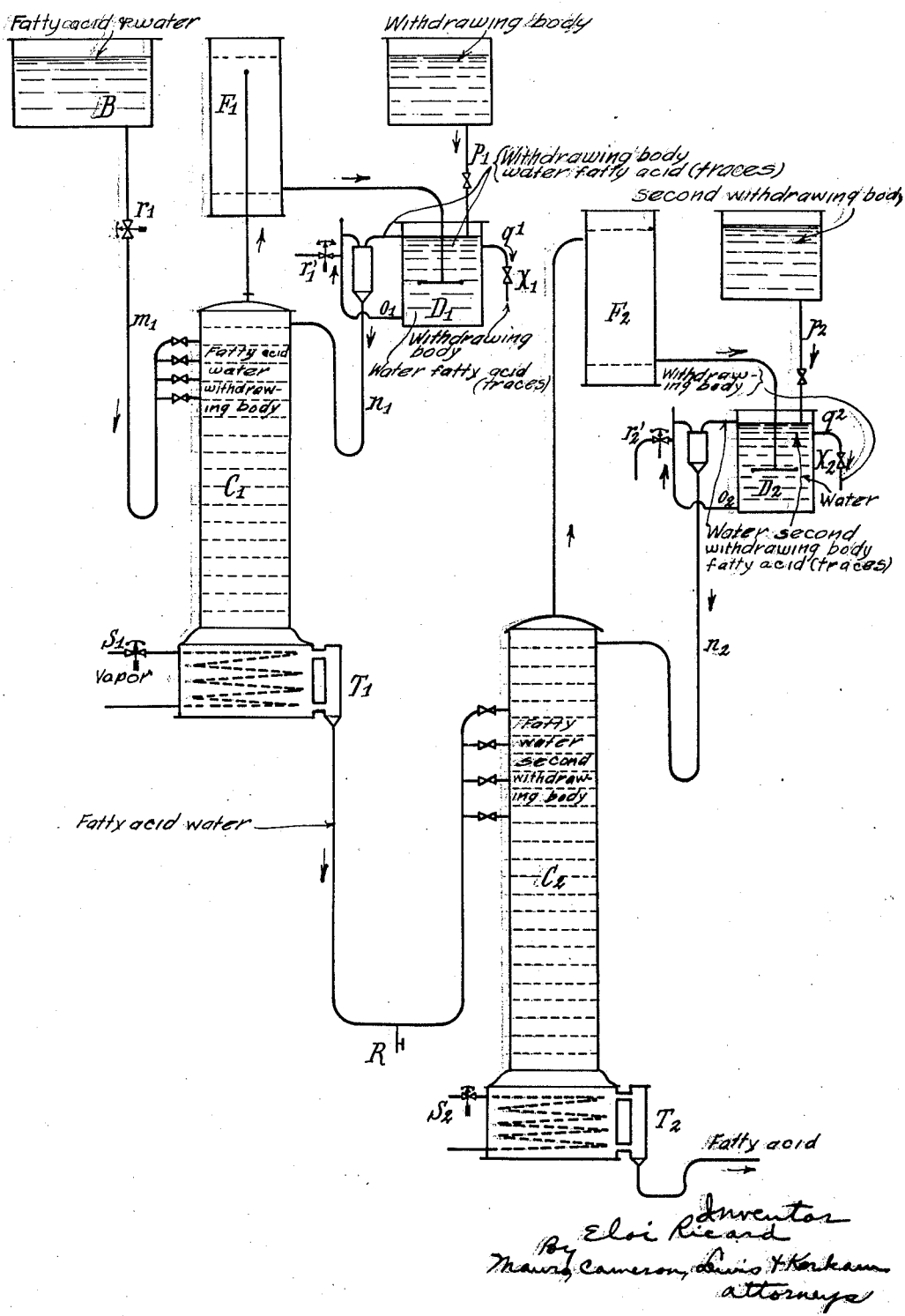

1,668,380

UNITED STATES PATENT OFFICE.

ELOI RICARD, OF MELLE, FRANCE, ASSIGNOR TO SOCIÉTÉ ANONYME DES DISTILLERIES DES DEUX-SEVRES, OF MELLE, FRANCE.

CONTINUOUS PROCESS FOR THE DEHYDRATION OF VOLATILE FATTY ACIDS.

Application filed December 26, 1924, Serial No. 758,261, and in Belgium December 28, 1923.

It is a known fact that aqueous solutions of certain volatile fatty acids, even when greatly diluted, will when heated to ebullition produce vapours containing an amount of acid which is by no means negligible as compared with the proportion in the initial mixture. This is the case for instance with propionic acid whose dilute aqueous solutions produce vapour wherein the proportion of acid is substantially the same as the proportion in the residual liquid. For this reason, the extraction of propionic acid by distillation from its aqueous solutions can only be performed on a practical scale by operating in the presence of certain withdrawing liquids which have the property of forming mixtures with water having a minimum boiling point, these being termed azeotropic mixtures. It has been observed that in these conditions a complete dehydration can be obtained; however, if such relatively dilute solutions are to be treated on a manufacturing scale, an ordinary distillation in the presence of a withdrawing liquid will not always prove advantageous as compared with the other chemical dehydration methods.

The present invention relates to a process and an apparatus by which the efficacy and the rapidity of the dehydrating method may be augmented by a distillation in the presence of withdrawing liquids, thus enabling the same to enter into competition on a manufacturing scale, and in nearly all cases, with analogous processes based upon different principles.

In the present process, the dehydration is performed in two stages. In the first stage, a withdrawing liquid (or a mixture of such liquids) is employed which has a relatively high boiling point and forms a binary mixture containing a large amount of water, in such manner as to remove the greater part of the water with a small consumption of steam.

In the second stage, a liquid is used which has a lower boiling point, and it can thus be more readily separated by distillation from the anhydrous acid obtained.

The said apparatus comprises two separate distilling columns, connected together or not, whereof the first employs the withdrawing substance having the higher boiling point and the second the withdrawing substance having the lower boiling point; each column is provided with the essential elements such as condenser, cooling device, settling apparatus, and means for surface heating.

The examples which will be given hereunder with reference to the appended drawings representing the said apparatus show the manner in which the said invention may be carried into effect.

*Example I.*—Dehydration of a 10 per cent acetic acid solution.

The acid contained in the constant level tank B is discharged through the conduit $m^1$ (provided with the valve $r^1$) and is thus supplied to the upper plates of the column $C_1$. The plates of the said column have been preliminarily—and once for all—charged with a suitable quantity of xylene. The bottom of the column is heated by the steam worm pipe $S_1$. The vapours are treated upon the plates in the known manner and are condensed in the cooling device $F_1$; the resulting liquid is circulated into the settling device $D_1$ wherein it separates in two layers; the upper layer which consists of xylene containing traces of water and acetic acid is delivered into the top of the column $C_1$ through the pipe $n_1$. The bottom layer consists of water containing a very small amount of acetic acid, and this is discharged through the offtake pipe $O_1$ provided with the valve $r'_1$.

Should the amount of acid which is withdrawn in the bottom layer be considered too large, this amount may be readily diminished either by a backward circulation in the pipe $n_1$ of a fraction of the lower layer which is formed, or by the addition of a small amount of pure water.

For example, a small amount of water is supplied to the settling device $D^1$ which falls into the lower layer and dilutes it. The same amount of solution is then returned into the distilling column from the lower layer by closing the cock $r'_1$. This acidulated water will enter the column $C_1$ and will form a sort of clarifying liquid which partly drives back the acid to the bottom of the column. It is found that shortly after this operation the amount of acid drawn over in the lower layer of the settling device $D_1$ is less and therefore the water circulated backwards into the column $C_1$ will be less acidulated. When standard operating conditions have been established and the quantity of water to be added has been properly selected, the acid will no longer escape from the column C₁ into the settling device D₁.

The acetic acid circulated between the said plates is thus dehydrated. The distillation is performed in such manner as to maintain the withdrawing liquid in the upper region of the column wherein it forms a binary mixture of water and xylene boiling near 91° C. and readily separating from the partially dehydrated acid liquid circulating at the lower part of the column. The distillation brings but a small amount of acid to the top of the column since the acid treated on the upper plates has the minimum concentration.

Thermometers are spaced along the column in order to ascertain at each instant the point to which the withdrawing liquid descends.

Xylene can be added through the supply pipe $p_1$ and can be discharged through the pipe $q_1$ provided with the valve $X_1$.

After the said column has been normally charged, it is in a condition to treat an unlimited amount of acid, since the same xylene will serve indefinitely for the withdrawal of the water.

The concentrated acetic acid supplied at the top of the column C₁ is discharged through the overflow T₁ into the column C₂; the valve R serves for the constant control of the degree of concentration of the acid produced.

The column C₂, whose plates have been preliminarily and once for all charged with benzol, operates in exactly the same manner as the column C₁. Since the boiling point of the benzol is somewhat low, it readily separates from the anhydrous acetic acid and affords a binary mixture of water and benzol (boiling at 69° C.) which, after distillation, is only slightly acid in spite of the high concentration of the liquid supplying the column C₂.

Thermometers spaced along the said column provided for the regulation of the charge of benzol in the proper manner. In the lower part, which is heated by the worm S₂, a sufficient heat is maintained in order that the finished product shall contain no traces of the withdrawing liquid. The acetic acid may be extracted either as liquid or as vapour.

*Example II.*—Dehydration of a 10 per cent aqueous solution of formic acid.

The plant is exactly the same as in the preceding case. In the column C₁ one may employ butyl formate as the withdrawing liquid, and in the column C₂ a refined gasoline or petrol boiling at 75°–80° C.

*Example III.*—Dehydration of a 10 per cent aqueous solution of acrylic acid.

The plant employed for this purpose is the same in all points as in Example I. In the column C₁ one may employ a solvent naphtha as the withdrawing liquid, and in the column C₂ normal butyl chloride boiling at 77° C.

It should be noted that the perfect dehydration of the volatile fatty acids obtained by means of the said apparatus and process, enables in the majority of cases the ready elimination of certain impurities during the operation, which latter usually consist of other fatty acids.

1.—Should the boiling point of such impurities be higher than that of the acid treated, it will suffice to extract the latter (as vapor or liquid) upon a few plates above the bottom part of the second column, in which part the said impurities will accumulate and can be removed in a continuous manner.

2.—Should the boiling point of the impurities be below that of the acid treated, they will be separated in a small accessory column of the known type, which is connected with the pipe T₂ discharging from the column C₂.

3.—If these two classes of impurities are present at the same time, the two above-indicated purifying methods can be employed together. This will be the case for example with acetic acid containing both formic acid and butylic acid as impurities.

What I claim is:

1. A process for the continuous dehydration of aqueous solutions of volatile fatty acids consisting in the distillation of said solutions in the presence of withdrawing liquid having the property of forming with water a binary mixture having a minimum boiling point, said withdrawing liquid having a relatively high boiling point, and in the subsequent distillation of the liquid resulting from said distilling operation with a second withdrawing liquid whereby the dehydration will be completed.

2. A process for the continuous dehydration of aqueous solutions of fatty acids consisting in the distillation of said solutions in the presence of withdrawing liquid having the property of forming with water a binary mixture having a minimum boiling point, said withdrawing liquid having a relatively high boiling point, and in the subsequent distillation of the liquid resulting from said distilling operation with a second withdrawing liquid having a relatively low boiling point.

3. A process for the continuous dehydration of aqueous solutions of fatty acids consisting in the distillation of said solutions in a distilling column in the presence of a liquid having the property of forming with water a mixture having a minimum boiling point, said liquid having a relatively high boiling point, in the condensation of the discharged vapors, in circulating the condensed liquid in a settling device wherein it separates into two layers, in discharging the layer which contains the major part of the water, in returning to the distilling column the layer containing the lesser amount of water, in discharging the partially dehydrated acid from the bottom of the said distilling column, in distilling the said acid in a second distilling column with a second withdrawing liquid having a relatively low boiling point.

4. A process for the continuous dehydration of aqueous solutions of fatty acids consisting in the distillation of said solutions in a distilling column in the presence of a liquid having the property of forming with water a mixture having a minimum boiling point, said liquid having a relatively high boiling point, in the condensation of the discharged vapors, in circulating the condensed liquid in a settling device wherein it separates into two layers, in discharging the layer which contains the major part of the water, in returning to the distilling column the layer containing the lesser amount of water, in discharging the partially dehydated acid from the bottom of the said distilling column, in distilling the said acid in a second distilling column with a second withdrawing liquid having a relatively low boiling point, in condensing the vapours discharged from the second distilling column, in circulating the condensed liquid into a second settling device wherein it separates into two layers, in returning the layer having the smaller proportion of water to the second distilling column, and in discharging the dehydrated acid at a point adjacent the bottom of the second distilling column.

5. A process for the continuous dehydration of aqueous solutions of fatty acids consisting in the distillation of said solutions in a distilling column in the presence of a liquid having the property of forming with water a mixture having a minimum boiling point, said liquid having a relatively high boiling pont, in the condensation of the discharged vapors, in circulating the condensed liquid in a settling device wherein it separates into two layers, in discharging the layer which contains the major part of the water, in returning to the distilling column the layer containing the lesser amount of water, in discharging the partially dehydrated acid from the bottom of the said distilling column, in distilling the said acid in a second distilling column with a second withdrawing liquid having a relatively low boiling point, in discharging the dehydrated acid at a short distance above the bottom of the second column in order that the impurities whose boiling point is above that of the acid under treatment may accumulate at the bottom of the said column.

6. A process for the continuous dehydration of aqueous solutions of fatty acids consisting in the distillation of said solutions in a distilling column in the presence of a liquid having the property of forming with water a mixture having a minimum boiling point, said liquid having a relatively high boiling point, in the condensation of the discharged vapors, in circulating the condensed liquid in a settling device wherein it separates into two layers, in discharging the layer which contains the major part of the water, in returning to the distilling column the layer containing the lesser amount of water, in discharging the partially dehydrated acid from the bottom of the said distilling column, in distilling the said acid in a second distilling column with a second withdrawing liquid having a relatively low boiling point, in circulating the dehydrated acid discharged from the bottom of the second column into an accessory distilling column of small size, in order to effect the separation of the impurities having a lower boiling point than that of the acid under treatment.

In testimony whereof I have signed this specification.

ELOI RICARD.